Aug. 19, 1958  F. T. SWEENEY  2,848,378
CATALYTIC HYDROCARBON CONVERSION PROCESS
Filed Jan. 30, 1953
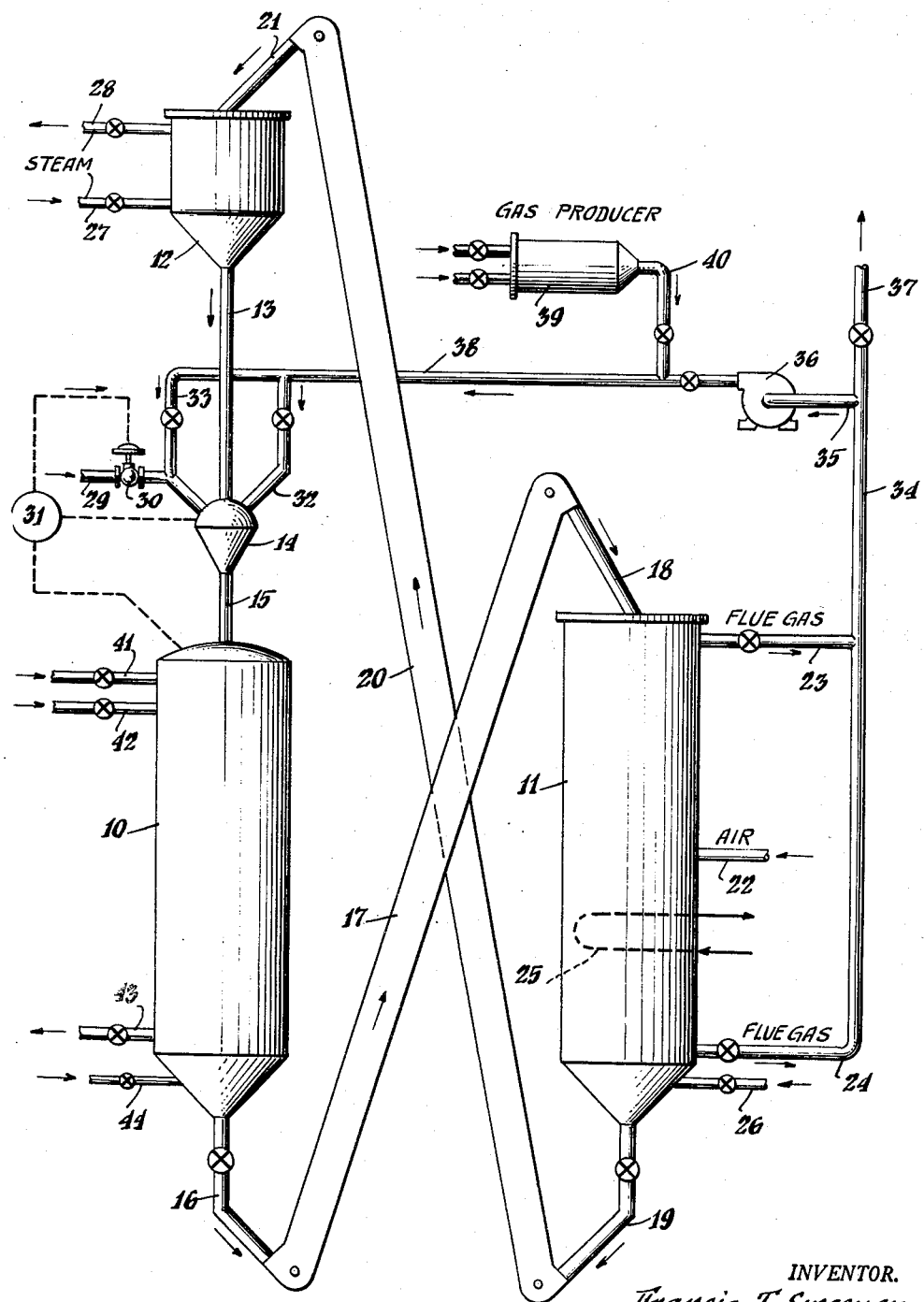
INVENTOR.
Francis T. Sweeney
BY
Andrew L. Gaboriault
AGENT

2,848,378

CATALYTIC HYDROCARBON CONVERSION PROCESS

Francis T. Sweeney, Palembang, Sumatra, Indonesia, assignor to Socony Mobil Oil Company, Inc., a corporation of New York Application January 30, 1953, Serial No. 334,149

5 Claims. (Cl. 196—52)

This invention is concerned with a continuous process for the conversion of fluid hydrocarbons in the presence of solid adsorbent catalyst particles. It is particularly concerned with a method for continuously supplying granular catalyst from the regeneration zone to the reaction zone of such processes wherein the reaction zone is at a higher pressure than the regeneration zone.

Typical of the processes to which this invention applies is the catalytic cracking of fluid hydrocarbons by contacting said hydrocarbons at a temperature of 850° F. and upward with a moving mass of granular catalyst, the catalyst being cycled continuously between a reaction zone wherein the catalyst is contacted with fluid hydrocarbons and a regeneration zone wherein the catalyst is reconditioned for re-use in the reaction zone. Other exemplary processes include the catalytic reforming, polymerization, aromatization, desulfurization, isomerization, and the like, of fluid hydrocarbon charge by contacting the charge with a suitable adsorbent catalyst.

Suitable catalysts for use in this invention include natural or treated clays, and the like, or synthetic associations of silica, alumina, or silica and alumina to which certain metallic oxides may be added in small amounts for specific purposes. The catalyst should be of palpable particulate form as distinguished from finely divided powder, and the term "granular" is used herein to refer to catalyst of that form. The catalyst should generally be within the range 1 inch to 100 mesh, and preferably 4 to 20 mesh by Tyler Standard Screen Analysis, and may be in the form of pellets, tablets, spheres, and the like, or may be of irregular shape such as is obtained from grinding and screening operations.

In a typical conversion process to which this invention may be applied, the catalyst gravitates through a reaction zone as a compact bed wherein it contacts the fluid hydrocarbon charge to effect the conversion thereof. The used catalyst bearing a carbonaceous contaminant deposited thereon by the conversion reaction is then passed to a reconditioning or regeneration zone where the contaminant is removed by burning. Normally, it is advantageous to operate the reaction zone at pressure above atmospheric, while the regeneration zone is operated at about atmospheric pressure. Hot, regenerated catalyst is passed to a supply region, such as a hopper, above the reaction zone and gravitated therefrom as a substantially compact stream through a confined seal leg into the upper end of the reactor. This seal leg is of restricted cross-sectional area compared to the reaction zone and of sufficient length to maintain the required pressure differential between reactor and supply region. Usually an inert seal gas is introduced into the seal leg at a level adjacent its lower end and at a pressure slightly above that in the reactor proper to prevent any hydrocarbon material from escaping from the reactor.

Catalyst from the regenerator is, of course, dehydrated by the burning therein. It has been found that when clay-type catalysts, that is, natural or treated clay catalysts, are being used and the hydrocarbon charge to the reactor contains some sulfur compounds, the dehydrated catalyst charged to the reactor is poisoned, probably by the formation of iron or other metal sulfides thereon, and quickly loses its activity.

A comparable situation occurs with synthetic silica-alumina catalyst when the hydrocarbon charge contains nickel compounds, as is frequently the case. The nickel compounds deposit on the catalyst and cause a substantial, and obviously undesirable, increae in the ratio of coke to gasoline produced. This type of poisoning also occurs to a somewhat lesser extent with clay-type catalysts.

In both of these cases it has been found desirable to hydrate the catalyst before it is supplied to the reaction zone and to maintain some steam in the upper end of the reactor to insure thorough hydration. In the case of nickel poisoning of silica-alumina catalysts, hydration is particularly effective where the catalyst contains small amounts of chromia. The simplest way of accomplishing this hydration is to utilize steam as the seal gas in the seal leg feeding the reactor. However, it has been found that if the seal steam is the only steam used to hydrate the catalyst, difficulty is encountered in the catalyst feed leg due to the rapid hydration of the catalyst which results in an excessive amount of seal gas flow in the lower end of the leg, and bridging of the catalyst and flow stoppages occur. To avoid this, Simpson et al., in U. S. Patent No. 2,471,398, propose a system wherein the catalyst is hydrated before it reaches the catalyst feed leg. However, in some cases, while the method of Simpson et al. shows an improvement, bridging of the catalyst in the feed leg still occurs.

An object of this invention is to provide a catalytic hydrocarbon conversion method which overcomes the above-described difficulties.

Another object is to provide a method for continuously supplying granular regenerated catalyst to the reaction zone of a continuous hydrocarbon conversion process.

Another object of this invention is to provide a continuous process for the conversion of a fluid hydrocarbon charge containing sulfur compounds in the presence of a granular clay-type catalyst, which process provides for minimum sulfur poisoning of the catalyst.

A further object is to provide an efficient method for the catalytic conversion of fluid hydrocarbon charge containing nickel compounds.

These and other objects of this invention will be apparent from the following discussion of the invention.

Broadly, this invention provides a method for supplying catalyst from the regeneration zone to the reaction zone of catalytic conversion processes employing granular solid adsorbent catalysts. The regenerated catalyst from the regeneration zone is passed to a region above the reaction zone which is maintained at a lower pressure than the reaction zone. A substantially compact feed stream of catalyst is gravitated from this region into the reaction zone. Seal gas is supplied to this feed stream at a level adjacent its lower end at a pressure above that in the reaction zone. This seal gas consists of steam and about twenty to seventy percent by volume of a non-condensible inert gas which is taken up by the catalyst to a less degree than steam. The term "non-condensible" is used herein to refer to materials which are in the gaseous phase under normal atmospheric conditions.

This invention will be best understood by referring to the attached diagrammatic drawing, which is an elevational view of a typical catalytic hydrocarbon conversion process utilizing this invention.

In this drawing there is shown a reactor 10 and regenerator or reconditioner 11 positioned side-by-side. Supply hopper 12 is positioned above reactor 10 and has a feed leg 13 extending downwardly from its lower end into a seal chamber 14 positioned immediately above reactor 10. Conduit 15 connects the bottom of seal chamber 14 with the upper section of reactor 10. Conduit 16 extends from the bottom of reactor 10 into a conveyor 17, which may be of any form suitable for transporting hot contact material, such as a bucket elevator or a gas lift. Conduit 18 connects the upper end of conveyor 17 with the upper section of regenerator 11, and conduit 19 connects the lower end of the regenerator with a second conveyor 20 which extends to a level above the supply hopper 12. Conduit 21 connects the upper end of conveyor 20 with the upper end of supply hopper 12.

In operation, spent coke-bearing catalyst is removed from the lower end of reactor 10 through conduit 16 and supplied to the upper end of regenerator 11 by means of conveyor 17 and conduit 18. The regenerator is maintained normally at atmospheric pressure or slightly thereabove. The spent catalyst passes through the regeneration zone in the regenerator as a downwardly gravitating, substantially compact column or bed. Air is admitted to a central location in this bed through conduit 22 in order to burn the coke from the spent catalyst. A portion of this air passes upwardly through the upper section of the catalyst bed while the remainder passes downwardly through the lower section of the catalyst bed. Flue gas is removed from the upper and lower sections of the regeneration zone through conduits 23 and 24. Suitable cooling coils 25 are provided within the regeneration zone to prevent the catalyst from being heated to a temperature at which it would become permanently damaged. In the lower section of regenerator 11 steam is supplied through conduit 26 in order to purge the regenerated catalyst and to effect at least a partial hydration thereof at this point. Regenerated catalyst is then removed from regenerator 11 through passage 19 and supplied to the upper end of hopper 12 by means of conveyor 20 and conduit 21. This hopper will normally be at about the same pressure as the regenerator. In the hopper the hydration of the catalyst is completed by means of steam admitted through conduit 27. This steam flows upwardly through the catalyst in the hopper and the excess is removed through conduit 28. Alternatively, the excess steam could pass upwardly through conduit 21 and be removed from the upper end of the elevator. The hydrated catalyst gravitates as a substantially compact feed stream into the upper end of the reactor 10 through conduit 13, seal chamber 14 and conduit 15. The reactor is normally maintained at a pressure well above atmospheric. Seal gas is supplied to chamber 14 at a pressure slightly above that maintained in reactor 10. This seal gas consists of steam and about twenty to seventy percent, and preferably forty to sixty percent by volume of a non-condensible inert gas which is taken up by the catalyst to a substantially less degree than the steam. The phrase "taken up" is used herein when referring to this inert gas, as including adsorption and/or absorption and/or condensation on the catalyst. Suitable inert gases include flue gas, nitrogen and the like. Flue gas is preferred because of its ready availability and low cost. Steam is admitted to chamber 14 through conduit 29 at a rate controlled by diaphragm valve 30 in response to differential pressure controller 31. Flue gas or other inert gas may be admitted directly to chamber 14 through conduit 32 or may be first mixed with the steam by supplying it to conduit 29 through conduit 33. The inert gas used may be part of the flue gas produced by the regenerator. In this case, flue gas from conduits 23 and 24 passes into conduit 34 and then into conduit 35. Since the regeneration zone is normally operated near atmospheric pressure while the reaction zone is operated above atmospheric pressure, this flue gas must be compressed. This is accomplished by blower 36. Flue gas which is not required for use as seal gas may pass from the process through conduit 37. Compressed flue gas passes through conduit 38 to be supplied to seal chamber 14 through either conduit 32 or 33. Alternatively, the required inert gas may be supplied from a separate gas producer 39. Gas from this producer may then pass into conduit 38 through passage 40. In this case all of the flue gas produced in the regenerator would be removed from the system through passage 32. Some seal gas enters the upper end of the reactor 10 through passage 15 while the remainder flows upwardly into hopper 12. Catalyst passes through the reaction zone in reactor 10 as a downwardly gravitating, substantially compact column. Hydrocarbon charge is supplied to the upper end of the reaction zone through conduits 41 and 42. A portion of the charge may be supplied as vapor through one of these conduits while the remainder is supplied as liquid through the other, if desired. Suitable means, well known in the art, for effecting uniform contact of the hydrocarbon charge and catalyst, may be provided within the upper end of reactor 10. Hydrocarbon charge passes downwardly through the catalyst bed in reactor and is converted to the desired products. These products are removed through passage 43. The spent coke-bearing catalyst is then purged by an inert gas such as steam or flue gas admitted through conduit 44 and then removed from the reactor through passage 16.

The apparatus in this drawing is particularly suited for use where it is desired to protect a clay catalyst from poisoning by sulfur compounds contained in the hydrocarbon charge to the reactor. Where it is desired to protect the catalyst only from poisoning by nickel compounds, the addition of steam through passages 26 and 27 may not be required, the steam in the seal gas accomplishing all the hydration required. By adding the required amount of inert gas to the seal steam, bridging of the catalyst within the feed leg 13 has been found to be entirely avoided. Thus, in this process steam may in some cases be added only through passage 29, while in other cases it may be desirable to add steam also through either or both of passages 26 and 27.

The various parts of the apparatus capable of performing the process in this invention may, of course, take widely different forms than those shown. For example, the seal chamber need not be maintained separately of the reactor as shown but may be within the upper end of the reactor. Also, conditions within the reactor, regenerator and other parts of the system may vary over a wide range. For example, the catalyst bed in the reactor and/or the regenerator need not necessarily be maintained in compacted condition but may exist as a boiling or fluidized bed in the manner well known to the art. Also, even where a compact bed is used in the reactor the fluid charge may be passed upwardly countercurrently to the bed rather than concurrently therewith as shown. Where the process is of the moving-mass cracking type, the temperature within the reactor may vary from 850 to 1100° F., while the pressure therein will normally be of the order of 5 to 30 pounds per square inch gauge. The total hydrocarbon space velocity to the reaction bed measured as liquid oil as 60° F. may be within the range about 0.5 to 10 volumes of oil per volume of reaction bed per hour. The total catalyst oil ratio within the reaction zone may be within the range about 2.0 to 20 parts of catalyst per part of oil by weight. The regeneration zone may be operated at a temperature within the range about 950 to 1150° F. The pressure in the regeneration zone will normally be very close to atmospheric, possibly a few pounds thereabove. As previously stated, the amount of inert gas in the seal gas should be within the range about twenty to seventy percent, and preferably forty to sixty percent by volume.

As an example of the process of this invention, the operation of a catalytic conversion process of the moving mass type according to this invention will be considered.

The catalyst used was a clay-type catalyst and was circulated through the system at a rate of 80-120 tons per hour. The reactor was operated at about 10-16 pounds per square inch gauge and was supplied with hydrocarbon charge at the rate of 11,500 to 14,000 barrels per day. Steam was supplied to the lower section of the regeneration zone at the rate of 24,900 to 26,600 pounds per day and to the surge hopper at the rate of 23,600 to 33,600 pounds per day. The seal gas consisted of steam and flue gas, with the flue gas amounting to about fifty-five percent by volume of the seal gas. The steam component of the seal gas amounted to 5,000 to 6,000 pounds per day.

It is intended to cover herein all changes and modifications of the examples of this invention herein chosen for purposes of disclosure which do not constitute departures from the spirit and scope of the invention.

I claim:

1. A continuous process for the conversion of fluid hydrocarbons in the presence of a granular adsorbent, which comprises: passing the catalyst through a reaction zone and contacting the catalyst therein with the fluid hydrocarbon charge to effect the desired conversion of the charge, passing spent catalyst from the reaction zone into a confined reconditioning zone and reconditioning the used catalyst therein for re-use in the reaction zone, passing reconditioned catalyst from the reconditioning zone to a region above the reaction zone maintained at a lower pressure than the reaction zone, passing catalyst from the lower pressure region into the reaction zone as a substantially compact feed stream of catalyst of substantially less cross-sectional area than the reaction zone, contacting the catalyst after reconditioning but prior to delivery to the upper end of said feed stream with steam to effect substantial hydration of the catalyst without effecting complete hydration of said catalyst and supplying seal gas to said feed stream adjacent its lower end, said seal gas consisting of steam and about twenty to seventy percent by volume of a non-condensible inert gas which is taken up by the catalyst to a substantially less extent than steam, whereby interruption in the flow of the feed stream supplying catalyst to the reaction zone is prevented.

2. A continuous process for the conversion of a fluid hydrocarbon charge containing sulfur compounds in the presence of a granular clay-type catalyst, which comprises: passing the granular clay-type catalyst through a confined reaction zone and contacting the catalyst therein with a fluid hydrocarbon charge which contains sulfur compounds to effect conversion of the charge, passing spent catalyst from the reaction zone into a confined reconditioning zone and reconditioning the use catalyst therein for re-use in the reaction zone, passing reconditioned catalyst from the reconditioning zone to a region above the reaction zone maintained at a lower pressure than the reaction zone, passing catalyst from the lower pressure region into the reaction zone as a substantially compact feed stream of catalyst of substantially less cross-sectional area than the reaction zone, contacting the catalyst after reconditioning but prior to delivery to the upper end of said feed stream with steam to effect substantial hydration of the catalyst without effecting complete hydration of said catalyst and supplying seal gas to said feed stream adjacent its lower end, said seal gas consisting of steam and about twenty to seventy percent by volume of a non-condensible inert gas which is taken up by the catalyst to a substantially less extent than steam, whereby interruption in the flow of the feed stream supplying catalyst to the reaction zone is prevented.

3. A continuous process for the conversion of a fluid hydrocarbon charge which contains nickel compounds in the presence of a granular adsorbent catalyst, which comprises: passing the granular catalyst cyclically through a confined reaction zone and a confined regeneration zone, passing a fluid hydrocarbon charge containing nickel compounds through the catalyst in the reaction zone to effect the desired conversion of the charge, reconditioning the catalyst in the regeneration zone for re-use in the reaction zone, supplying dehydrated regenerated catalyst from a lower pressure region above the reaction zone into the reaction zone as a compact gravitating feed stream of substantially less cross-sectional area than the reaction zone, and supplying adjacent the lower end of the feed stream a seal and hydration gas consisting of steam and about twenty to seventy percent by volume of non-condensible inert gas which is taken up by the catalyst to a substantially less extent than steam, whereby interruption in the flow of the feed stream supplying catalyst to the reaction zone is prevented.

4. In a continuous process for the conversion of fluid hydrocarbons wherein a granular adsorbent catalyst is passed cyclically through a reaction zone in which the catalyst contacts fluid hydrocarbons to effect the conversion thereof and a regeneration zone in which the catalyst is reconditioned for re-use in the reaction zone, the improved method of supplying catalyst from the regeneration zone to the reaction zone, which comprises: passing dehydrated regenerated catalyst from the regeneration zone to a region above the reaction zone maintained at a pressure below the pressure in the reaction zone, gravitating a substantially compact feed stream of catalyst of substantially less cross-sectional area than the reaction zone from the lower pressure region into the reaction zone and supplying seal gas to the feed stream at a level adjacent the lower end of the feed stream at a pressure above that in the reaction zone, said seal gas consisting of steam and about forty to sixty percent by volume of a non-condensible inert gas which is taken up by the catalyst to a substantially less degree than the steam, whereby interruption in the flow of the feed stream supplying catalyst to the reaction zone is prevented.

5. A continuous process for the conversion of fluid hydrocarbons in the presence of a granular adsorbent catalyst, which comprises: passing the catalyst through a reaction zone and contacting the catalyst therein with the fluid hydrocarbon charge to effect the desired conversion of the charge, passing spent catalyst from the reaction zone into a confined reconditioning zone and reconditioning the used catalyst therein for re-use in the reaction zone, passing reconditioned and dehydrated catalyst from the reconditioning zone to a region above the reaction zone maintained at a lower pressure than the reaction zone, passing catalyst from the lower pressure region into the reaction zone as a substantially compact feed stream of catalyst of substantially less cross-sectional area than the reaction zone, contacting the catalyst after reconditioning but prior to delivery to the upper end of said feed stream with steam to effect substantial hydration of the catalyst and supplying seal gas to said feed stream adjacent its lower end, said seal gas consisting of steam and about forty to sixty percent by volume of a non-condensible inert gas which is taken up by the catalyst to a substantially less extent than steam, whereby interruption in the flow of the feed stream supplying catalyst to the reaction zone is prevented.

References Cited in the file of this patent

UNITED STATES PATENTS

| | | |
|---|---|---|
| 2,471,398 | Simpson et al. | May 24, 1949 |
| 2,488,488 | Bergstrom | Nov. 15, 1949 |
| 2,490,774 | Bland | Dec. 13, 1949 |
| 2,543,070 | Shabaker | Feb. 27, 1951 |
| 2,561,771 | Ardern | July 24, 1951 |
| 2,626,235 | Wilson | Jan. 20, 1953 |
| 2,658,859 | Dart | Nov. 10, 1953 |

OTHER REFERENCES

H. A. Shabaker: Vol. No. 1, May 1948, Houdry Pioneer, pages 1 to 8.

Aging of Cracking Catalysts, by G. A. Mills, Ind. and Eng. Chem., vol. 42, pages 182 to 187.